United States Patent [19]

Hunter

[11] Patent Number: 5,792,539
[45] Date of Patent: Aug. 11, 1998

[54] INSULATION BARRIER

[75] Inventor: Rick Cole Hunter, Friendswood, Tex.

[73] Assignee: Oceaneering International, Inc., Houston, Tex.

[21] Appl. No.: 682,933

[22] Filed: Jul. 8, 1996

[51] Int. Cl.$^6$ .................................................. B32B 3/00
[52] U.S. Cl. .................. 428/72; 428/178; 428/179; 428/182; 428/184; 52/783.11; 52/794.1
[58] Field of Search .................. 428/182, 172, 428/184, 72, 76, 178, 179, 913; 52/783.11, 794.1

[56] References Cited

U.S. PATENT DOCUMENTS

| | | | |
|---|---|---|---|
| 2,314,876 | 3/1943 | Greene | 428/158 |
| 3,086,899 | 4/1963 | Smith et al. | 428/178 |
| 4,055,268 | 10/1977 | Barthe | 220/9 C |
| 4,204,016 | 5/1980 | Chavannes | 425/108 |
| 4,513,041 | 4/1985 | Delluc | 428/69 |
| 4,579,756 | 4/1986 | Edgel | 428/34 |
| 4,783,356 | 11/1988 | Kugelmann | 428/69 |
| 4,791,773 | 12/1988 | Taylor | 52/790 |
| 4,837,388 | 6/1989 | Kugelmann | 428/69 |
| 5,018,328 | 5/1991 | Cur et al. | 220/420 |
| 5,032,439 | 7/1991 | Glicksman et al. | 428/44 |
| 5,082,335 | 1/1992 | Cur et al. | 312/401 |
| 5,090,981 | 2/1992 | Rusek, Jr. | 65/4.4 |
| 5,094,899 | 3/1992 | Rusek | 428/69 |
| 5,107,649 | 4/1992 | Benson et al. | 52/309.4 |
| 5,157,893 | 10/1992 | Benson et al. | 52/792 |
| 5,252,408 | 10/1993 | Bridges et al. | 428/621 |
| 5,271,980 | 12/1993 | Bell | 428/68 |
| 5,330,816 | 7/1994 | Rusek | 428/69 |
| 5,376,424 | 12/1994 | Watanabe | 428/69 |
| 5,398,510 | 3/1995 | Gilley et al. | 62/3.6 |
| 5,399,408 | 3/1995 | Nowara | 428/73 |
| 5,445,857 | 8/1995 | Nowobilski | 428/69 |
| 5,505,046 | 4/1996 | Nelson et al. | 62/3.6 |
| 5,522,216 | 6/1996 | Park et al. | 62/3.6 |

*Primary Examiner*—Donald Loney
*Attorney, Agent, or Firm*—Kurt S. Myers

[57] ABSTRACT

The present invention is directed to thermal insulation elements each formed of a structural material with a highly emittant surface having a geometric shape of a repetitive three dimensional design which permits alternate stacking of one thermal insulation element alternately with another thermal insulation element and which locks movement of adjacent thermal insulation elements in at least one of the directions 90° to the stacking direction; and more specifically, to a thermal insulation barrier having at least three alternately stacked thermal insulation elements, two of the thermal insulation elements having the same design, the alternate thermal insulation element having a complementary design, whereby when the thermal insulation elements are alternately stacked, any point of contact between thermal insulation elements is a contact between the alternate thermal insulation element and only one of the other thermal insulation elements. The present invention is also directed to a panel which has a rigid multi-layer thermal insulation barrier supporting an envelope of thin skin high gas barrier material which is evacuated.

29 Claims, 11 Drawing Sheets

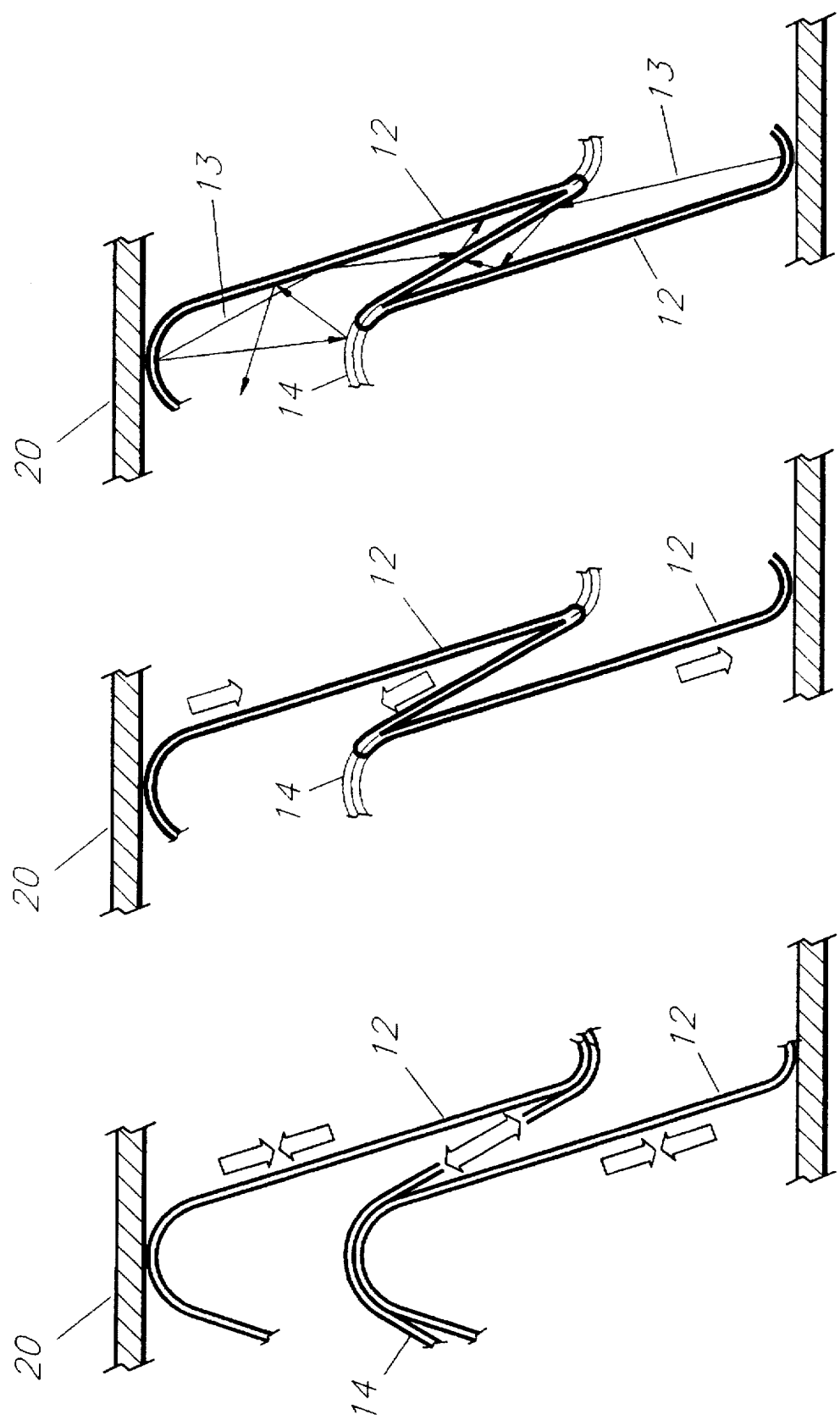

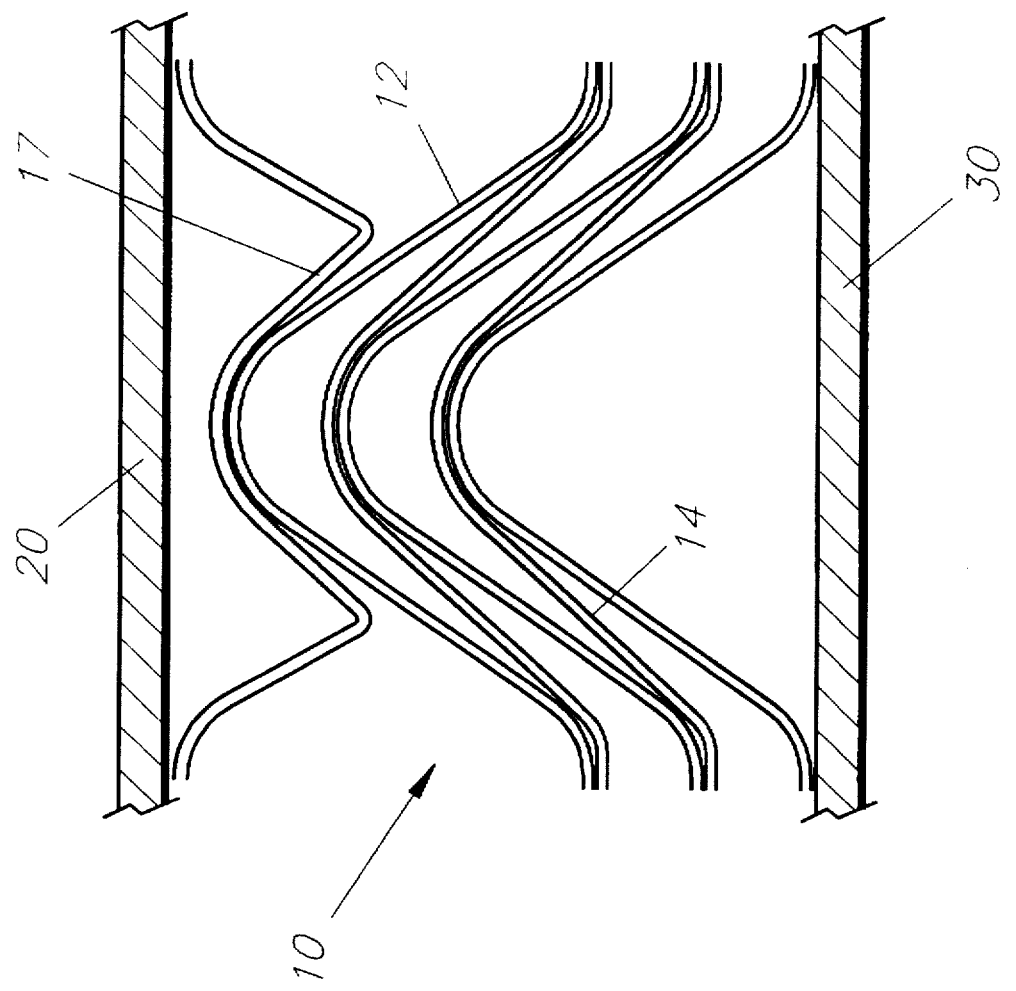

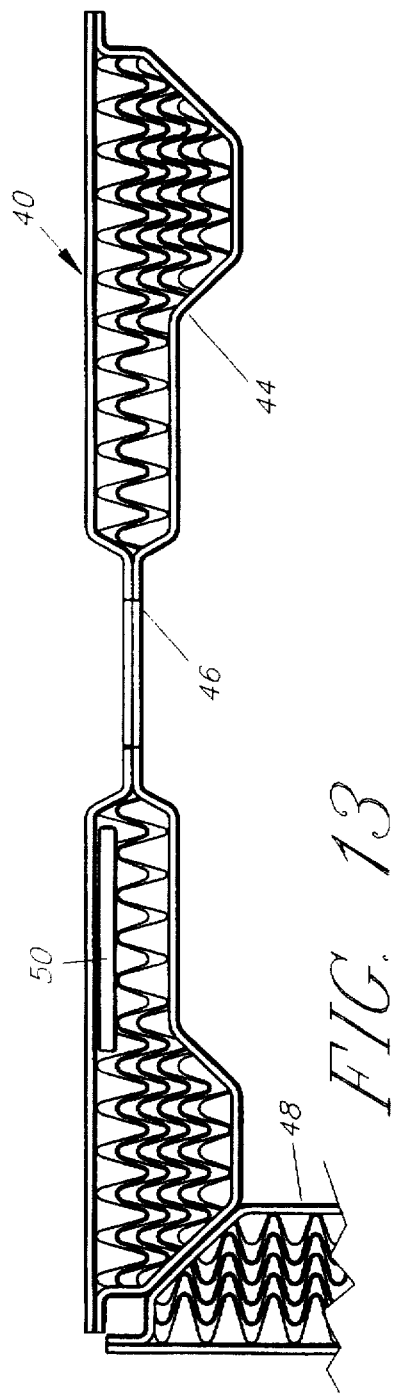
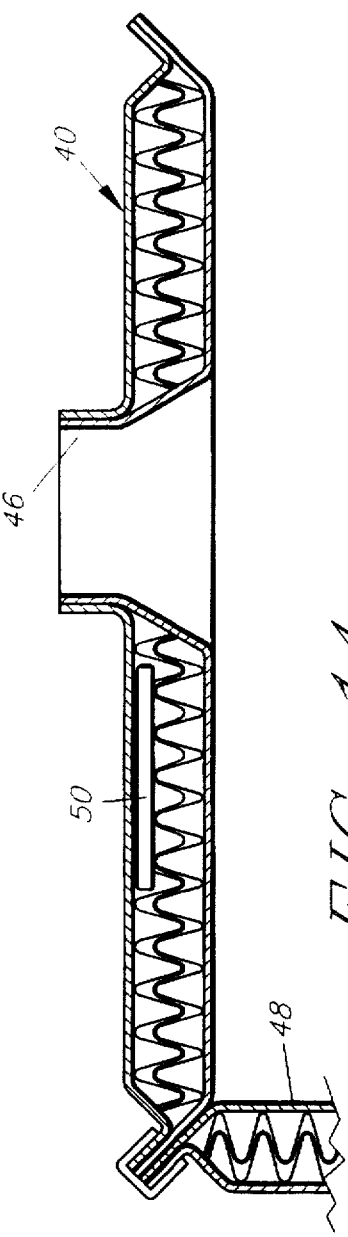
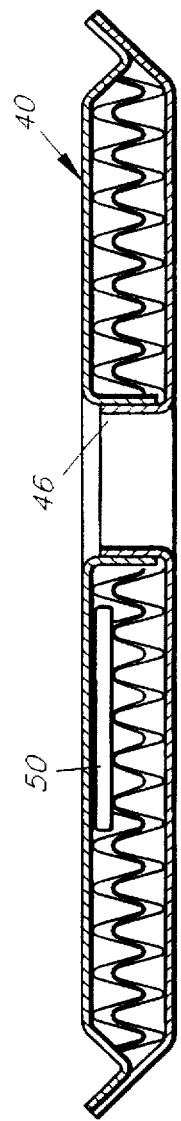

INSULATION BARRIER

FIELD OF THE INVENTION

The present invention is directed to a unique thermal insulation barrier. More specifically, the present invention is directed to a rigid multi-layer thermal insulation barrier which supports the outer skin of an evacuated or vacuum panel.

BACKGROUND OF THE INVENTION

U.S. Pat. No. 4,055,268 discloses a double walled cryogenic storage container with a vacuum space containing multi-layer insulation comprising thin radiation layers separated by permanently precompressed fiber sheets.

U.S. Pat. No. 4,513,041 discloses insulating panels in which evacuated cells are inserted. Each vacuum cell is composed of a rigid plastic tube, both ends of which are closed by perforated plugs, and the tube placed in a thin flexible sheath of highly impervious plastic material. This sheath extends beyond both ends of the rigid tube and is sealed by welding after the rigid tube has been evacuated to a high vacuum.

U.S. Pat. No. 4,579,756 discloses an insulating sheet material made of a plurality of air tight chambers, each having a partial vacuum therein, held together in closely spaced side-by-side relationship so as to form a sheet of such compartments.

U.S. Pat. Nos. 4,783,356 and 4,837,388 disclose an article of insulation which has outer sheet-like elements of elastic material secured by adhesive to a rigid deformable material as an inner element and deforming in a particular pattern, following which the inner element retains its deformed shape while the outer elements spring back to their original shape, leaving voids in which there is a partial vacuum.

U.S. Pat. No. 4,791,773 discloses a pair of panel sheets which form a sandwich with an undulated ribbon-like spacer in the interior thereof and marginal spacers about the periphery of the sheets. A vacuum within the space between the marginal spacers insulates and rigidifies the assembly.

U.S. Pat. No. 5,018,328 discloses a vacuum insulation panel having flexible gas impermeable walls formed in multiple substantially adjacent compartments. Multiple compartments are utilized to enhance the long term thermal characteristics of the panel by "protecting" the vacuum characteristics of at least one of the compartments by surrounding it with additional evacuated compartments. This results in a very minimal gas pressure gradient across the internal walls forming the internal compartment to minimize gas and vapor permeation into it, thus greatly enhancing the lifetime of the panel. Further, this permits strategic placing of gettering materials such that gettering materials absorbing certain gases can be placed in the outer compartments and other gettering materials absorbing different gases can be placed in the internal compartments to enhance the lifetime of the panel.

U.S. Pat. No. 5,032,439 discloses thermal insulation vacuum panels formed of an inner core of compressed low thermal conductivity powders enclosed by a ceramic/glass envelope evacuated to a low pressure.

U.S. Pat. No. 5,082,335 discloses a refrigeration appliance having a vacuum insulation system wherein a combination of vacuum thermal insulation panels and polyurethane foam provide the thermal insulating properties as well as structural support.

U.S. Pat. No. 5,090,981 discloses a method for making high R superinsulation panels; U.S. Pat. No. 5,094,899 discloses an insulation panel which comprises a mineral fiber board, the fibers having no organic binder thereon, and particulate material packed in the interstices of the board and a gas tight envelope encapsulating the board, the envelope being evacuated; and U.S. Pat. No. 5,330,816 discloses a superinsulation panel.

U.S. Pat. Nos. 5,107,649 and 5,157,893 disclose an ultra-thin compact vacuum insulation panel comprised of two hard but bendable metal wall sheets closely spaced apart from each other and welded around the edges to enclose a vacuum chamber. Glass or ceramic spacers hold the wall sheets apart.

U.S. Pat. No. 5,252,408 discloses a vacuum insulated panel formed of peripherally welded metallic wall members which define a cavity within which a solid compressed block of a particulate material is disposed. The particulate material, preferably an activated carbon black, a silica gel or a combination thereof, serves as a barrier to radiant thermal transmission through the panel, acts as a getter to maintain the vacuum in the cavity, and, with proper density, supports the walls of the panel against collapse when the cavity is evacuated.

U.S. Pat. No. 5,271,980 discloses a flexible insulating panel which comprises a first flexible external sheet opposing a second flexible external sheet, each sheet comprises a plurality of corrugated gas impermeable layers joined with a gas tight seal to form an internal space that is evacuated of air. Spacers press against a membrane to resist the facewise compressive forces. The evacuated insulating panel is flexible, both in use and application.

U.S. Pat. No. 5,376,424 discloses a thermal insulating material which is packed in a sealing bag composed of an obverse face material and a reverse face material, each made of a metal foil, and which is sandwiched by a sealant layer of plastic film adhesively affixed to one side thereof and by a surface layer of plastic film adhesively affixed to the other side thereof.

U.S. Pat. No. 5,398,510 discloses a superinsulation panel and a thermoelectric assembly which maintains the temperature within a refrigerator or other type of enclosed structure at a desired value.

U.S. Pat. No. 5,399,408 discloses a thermal insulating body for thermal insulation, consisting of a shell which can be evacuated and which is filled with a solid, microporous thermal insulating material.

U.S. Pat. No. 5,445,857 discloses vacuum insulating panels which are provided with textured surfaces that localize thermal expansion.

U.S. Pat. No. 5,505,046 discloses apparatus including a power supply and control system to provide for maintaining the temperature within an enclosed structure using thermoelectric devices.

U.S. Pat. No. 5,522,216 discloses a refrigerator which combines the benefits of superinsulation materials with thermoelectric devices and phase change materials to provide an environmentally benign system that is energy efficient and can maintain relatively uniform temperatures for extended periods of time with relatively low electrical power requirements.

SUMMARY OF THE INVENTION

The present invention is directed to thermal insulation elements each formed of a structural material having a geometric shape of a repetitive three dimensional design which permits stacking of one thermal insulation element with another thermal insulation element having a complimentary geometric shape and which locks movement of adjacent thermal insulation elements in at least one of the directions 90° to the stacking direction; and more specifically, to a multi-layer thermal insulation barrier having multiple thermal insulation elements, a number of the thermal insulation elements having the same design and other thermal insulation element having a complementary design, whereby when three thermal insulation elements are alternately stacked, any point of contact between thermal insulation elements is a contact between only two of the thermal insulation elements. The present invention is also directed a rigid multi-layer thermal insulation barrier supporting an envelope of thin skin high gas barrier material which is evacuated.

BRIEF DESCRIPTION OF THE DRAWINGS

FIG. 2 is a schematic view of one design of the thermal insulation barrier of the present invention showing three thermal insulation elements, the outside elements are in compression and the alternate element is in tension;

FIG. 3 is a schematic view of the thermal insulation barrier of FIG. 2 showing the thermal conduction path across the barrier;

FIG. 4 is a schematic view of the thermal insulation barrier of FIG. 2 showing a representative radiant heat emittance path across the barrier;

FIG. 5 is a cross-sectional view of one design of a multilayer thermal insulation barrier of the present invention with a few layers of thermal insulation elements;

FIGS. 13, 14 and 15 are cross-sectional views of a panel with various designs of openings in the panel and each panel has a "getter element" in the panel.

DESCRIPTION OF THE PREFERRED EMBODIMENTS

Figure 1:
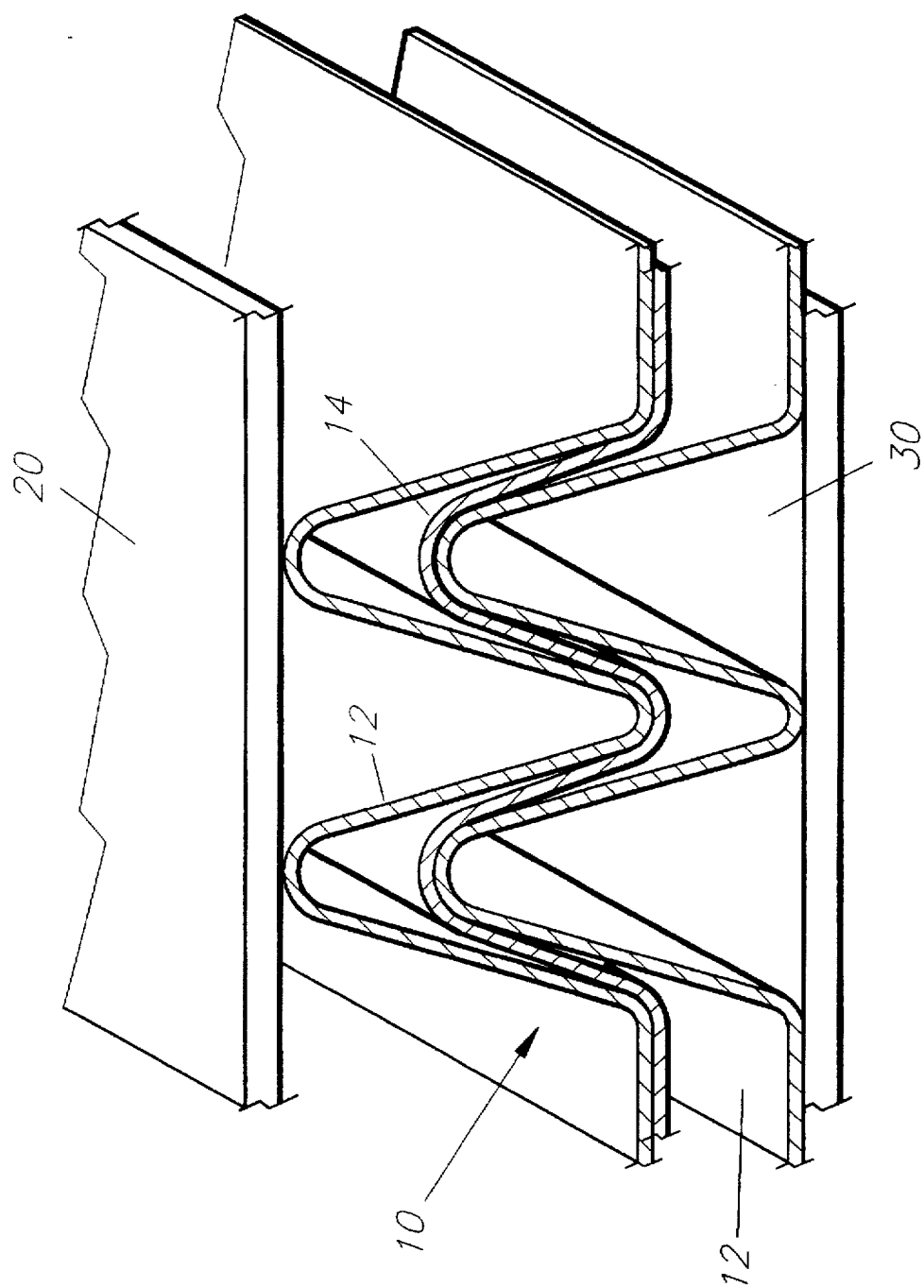
FIG. 1 is an isometric cross-sectional view of one design of a thermal insulation barrier of the present invention between two surfaces.

The most basic structure using a thermal insulation barrier is a box within a box, for example a refrigerator. The insulation barrier for a conventional refrigerator acts to minimize the heat transfer from the outside surface of the outside box to the inside surface of the inner box, the surface which holds the shelves and other structure of the conventional refrigerator. The outside surface of the refrigerator is exposed to ambient conditions and the thermal insulation barrier acts to minimize the heat transfer from the outside surface to the inside box where food is stored. Referring now to FIG. 1, a barrier 10 is shown between two surfaces, one surface 20 and the second 30. For the purpose of explanation of the present invention, surface 20 may be the outside box of a refrigerator and surface 30 the inner box.

An exceptional thermal insulation barrier must address the three types of heat transfer which a barrier encounters; namely, convection, conduction and radiation. Most of the prior art insulation systems address one or two but not all three types of heat transfer which a thermal insulation barrier encounters. Furthermore, when systems use vacuum (low vacuum, $10^{-3}$ torr or higher pressure; high vacuum, $10^{-3}$ torr or lower pressure), the thermal insulation barrier used to separate and maintain separation of the outside skin of the gas barrier material also has to carry the atmospheric pressure load. The thermal insulation barriers of the present invention address all forms of heat transfer and the load requirements of an exceptional insulation.

As with most insulation barriers, the thermal insulation barrier of the present invention is used to fill a space between the hot and cold surfaces and in filling that space reduces the heat transfer by convection of the gases in that space. Heat transfer by convection requires a movement of the fluid (gases) in contact with a surface. One aspect of the present invention is that the size of any gas space within the insulation barrier may be very small reducing the movement of the gases. Convective heat transfer is further minimized by the removal of gases from the space, i.e. by evacuation. Any such vacuum system requires a structure to support the differential pressure between the atmospheric outside pressure and the internal reduced pressure. Solid conductive heat transfer is minimized by extending the length of the heat length path. Radiant heat transfer is minimized by using multiple layers of heat reflective surfaces.

The unique feature of the thermal insulation barrier of the present invention is that the barrier is made of alternating stacking thermal insulation elements. There are therefore several different, at least two, thermal insulation elements used to make the thermal insulation barrier of the present invention. For the purpose of this application, "stacking" requires that two adjacent insulation elements each have a corresponding three dimensional design which fit one within the other but which provides a minimal surface contact between the two elements as contrasted to "nesting" where two products having corresponding three dimensional designs, e.g. DIXIE cups, Dixie being a registered trademark of the James River Corporation, when placed one within the other have substantial contact between the surfaces of the adjacent cups. Stacking occurs when the elements have corresponding but different designs rather than the same or identical designs. The preferred thermal insulation barrier is made with a pair of thermal insulation elements, one element having a specific three dimensional design and the second element having a corresponding three dimensional design which causes stacking of the two adjacent elements.

In one embodiment the thermal insulation elements used to make the thermal insulation barrier of the present invention are made of a structural material with a highly emittant surface formed into a geometric shape having a repetitive three dimensional design which permits stacking. In another embodiment of the present invention, the top and bottom elements of the barrier are not uniform in thickness as the other elements used in the barrier and need not have a highly emittant surface. The repetitive three dimensional design of alternatively "stacked" thermal insulation elements is not identical but are complimentary. Two different thermal insulation elements are "complimentary" when the repetitive three dimensional design of the alternate elements cause "stacking", not nesting, and lock movement of adjacent thermal insulation elements in at least one of the directions 90° to the stacking direction.

The complimentary elements are preferably alternately placed in the barrier; however, when more than one thermal insulation element is nested in a barrier, the nested elements are not considered alternate elements in the barrier but are considered equivalent to a single element of the combined thickness of the nested elements. Nested elements may be used at the top and bottom of the thermal insulation barrier to increase strength without the addition of any significant addition of height to the barrier.

Again referring to FIG. 1 which shows one design, a beam design of the thermal insulation elements, the top and bottom thermal insulation elements 12 have the same or identical three dimensional design. In this beam design, a cross-section of the repetitive three dimensional design of top and bottom thermal insulation elements 12 is a sine-like wave with a certain base and amplitude; whereas, the cross-section of the repetitive three dimensional design of thermal insulation element 14 is a sine-like wave with the same base and a smaller amplitude. In this beam design, this difference in the three dimensional design of the two different thermal insulation elements, insulation elements 12 and thermal insulation element 14, are thus complimentary since the alternate elements causes stacking as shown and further locks the adjacent elements so that they cannot move in the horizontal plane which is 90° to the vertical stacking plane.

Referring to FIG. 2, it is clear that the alternate stacking of the elements places the thermal insulation element 12 in compression and the thermal insulation element 14 in tension.

The thermal insulation elements are made by forming a material such as a thermoplastic, thermoset, ceramic, metal or composite into a geometric shape. Thermoplastics are formed by extrusion, injection molding, blow molding or pressure-thermal forming; thermosets and ceramics are formed by molding or pressure-thermal forming; metals are formed by stamping or pressure-thermal forming. Many suitable thermoplastics are composites in that they contain other materials such as paper, glass or aggregate in the form of fibers, fine particles or film.

The choice of material used to make the thermal insulation elements of the present invention is primarily related to the thermal and physical properties of the material. No single property of a material will be determinative for making the thermal insulation elements of the present invention. For example, the thermal conductivity of a metal such as aluminum is high and therefore as the sole material for a thermal insulation element is not as suitable for making a thermal insulation element as other materials, i.e. thermoplastics; however, aluminum has a highly emmittant surface. A composite composed of a thin film of aluminum as a emittant surface on a thermoplastic, on the other hand, is a material where the thermal conductivity of the composite of the metal and thermoplastic is only slightly greater than that of the thermoplastic, which is very low. As will be explained in more detail hereinafter, composites, especially those materials having a highly emittant surface layered on another material, are preferred as the material of the thermal insulation elements of the present invention.

The heat transfer through solids (Q) is proportional to the mean thermal conductivity (measured at two temperatures) of the material ($k_m$), the cross-sectional area (A) through which the heat flows and the temperature difference across the conductor material but is inversely proportional to the length (L) of the conduction path. The thermal insulation elements of the present invention are formed as thin as possible to minimize the cross-sectional area (A) through which the heat flows. The thickness of the barrier element is limited by tensile strength for the tensile element and by resistance to buckling for the compression element. The stacking of the thermal insulation elements to produce the thermal insulation barriers of the present invention is to maximize the length (L) of the thermal path through the barriers and thus minimize the heat transfer. Thus, the ratio of A/L is minimized. Referring now to FIG. 3, the heat path is extended or maximized since the heat path through the outer surface 20 to thermal insulation element 12 and then to thermal insulation element 14 is only at the points of contact between thermal insulation element 12 and the surface 20 and the element 14. Likewise, the heat path is further extended between the thermal insulation element 14 and the second thermal insulation element 12, as shown by the arrows in FIG. 3. The thermal conduction path L of the thermal insulation barriers of the present invention is many times greater than barriers of the prior art and typically can exceed at least two (2) to five (5) times the distance between the hot and cold surfaces 20 and 30 respectively.

The conduction of heat through the gas present in the spaces of an insulation barrier is also addressed in the thermal insulation barriers of the present invention. It is preferred that the thermal insulation barriers of the present invention are placed into a space which is evacuated. When evacuated, the removal of the gases in the spaces of the barrier minimizes conductive heat transfer across the barrier. Furthermore, the thermal insulation barrier of the present invention provides multiple layers (barriers) to minimize movement of the gases to transfer conductive heat across the barrier space. When the barrier space is evacuated and the thermal insulation barriers support the surfaces (surfaces 20 and 30 being the skins of a panel, as will be described in more detail hereinafter), then the thermal insulation barriers of the present invention must be able to carry the high compressive loads of an evacuated structure to balance the atmospheric pressure load. This parameter of load will affect the geometry selection of the thermal insulation barriers of the present invention (this parameter and the effect on geometry will be described in more detail hereinafter). The evacuation of the space in which the thermal insulation barriers are placed may be at a low vacuum or a high vacuum. When a vacuum is drawn on certain designs of the thermal insulation barrier, the compressive thermal insulation elements 12 may have openings 16 (see FIG. 7) to permit the removal of gases trapped in the spaces formed by the stacked thermal insulation elements. These openings 16 are random and may be located so that they have the least effect on the structural properties of the elements. In some stacking configurations where the spaces are relatively closed, the openings may be in both the compression and tension elements. The openings 16 are positioned to open a tight or limited space on one side of the element to a larger space to remove the gases and not allow entrapment when the thermal insulation barrier is evacuated.

As important as the selection of the material for the thermal insulation elements to obtain minimum mean thermal conductivity of the material ($k_m$) and to stack the elements according to the present invention to minimize the ratio of A/L, it is preferred that the surface of the formed thermal insulation element be a highly emittant surface. This characteristic of the thermal insulation barriers of the present invention addresses the radiation component of heat transfer. Since the heat transfer by radiation is directly proportional to the emissivity and emissivity is the reciprocal of emittance, the higher the heat emittance of the surface the lower the heat transfer. The preferred thermal insulation barriers of the present invention have multiple layers of elements with at least one surface of continuous heat reflective material to greatly reduce radiative heat transfer. The preferred thermal insulation elements of the present invention are made of a material with a surface to provide the desired high heat reflection or emission. Therefore, the preferred materials for making the thermal insulation elements are composites, meaning either a layered composite with an outer layer of material that has a highly emittant surface or a material that is coated or treated before or after the elements are formed into a geometric shape, for example the shape of a beam. A schematic representation of a radiant heat path 13 between the highly emittant surfaces of the thermal insulation elements of the present invention is shown in FIG. 4.

The cumulative parameters as chosen above can produce a thermal insulation barrier of the present invention which has an R value (the standard rating of insulation), excluding any edge effect, of three to ten times higher than the best known insulation systems. It is clear therefore that the thermal insulation barriers of the present invention address all four parameters of an exceptional insulation barrier and are better than any known prior art thermal barrier.

Figure 6:
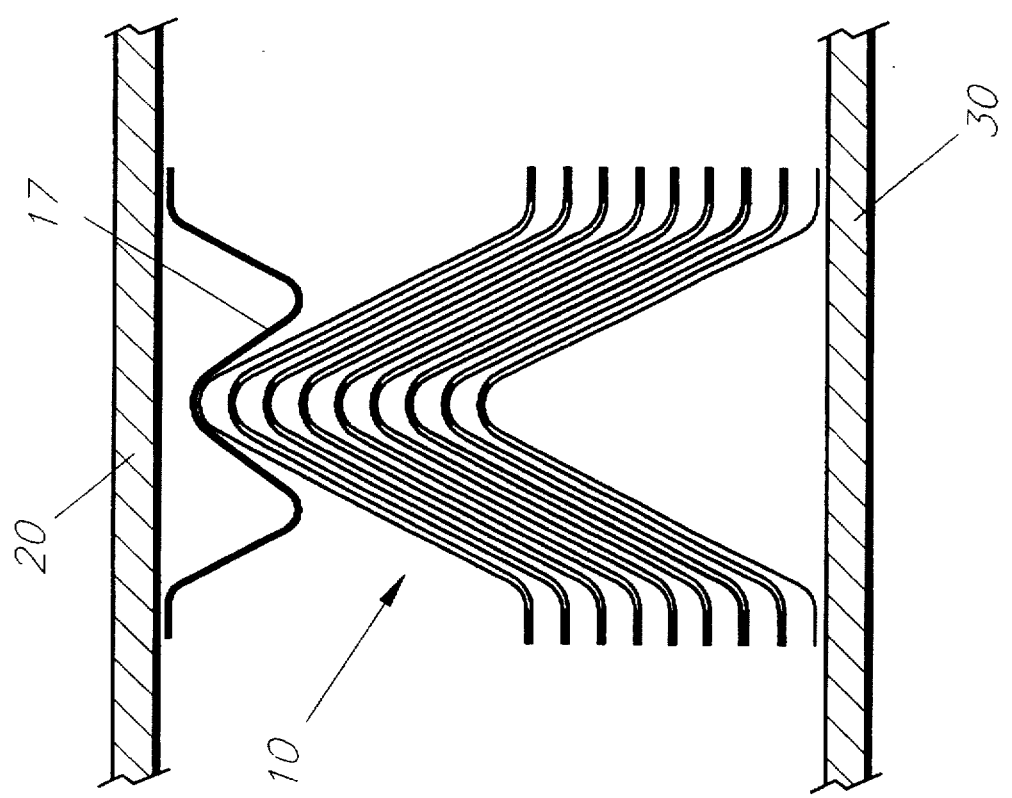
FIG. 6 is a cross-sectional view of the same design of a multi-layer thermal insulation barrier of the present invention with more layers of thermal insulation elements.

Referring now to FIG. 5, another feature of the present invention is that the preferred thermal insulation barrier is multi-layer. A multi-layer thermal insulation barrier 10 is formed with any number of thermal insulation elements. In a preferred barrier 10 there are an odd number of elements with top and bottom thermal insulation elements 12, which contact surfaces 20 and 30 respectively, in compression and alternate thermal insulation elements 14 in tension. There is no limit to the number of alternately stacked thermal insulation elements which may be used to form a multi-layer thermal insulation barrier 10, as illustrated in FIG. 6. It is clear that the significance of the number of thermal insulation elements used in stacking is to minimize the A/L ratio by lengthening L and to minimize radiation heat transfer. Additionally, heat transfer is minimized by the thermal contact resistance which exists at the surfaces of mating thermal insulation elements. The greater the number of heat resistant contacts in the direction through the thermal insulation barrier or in the direction between the surfaces (one hot and one cold), the greater the thermal resistance of the thermal insulation barrier.

Figure 7:
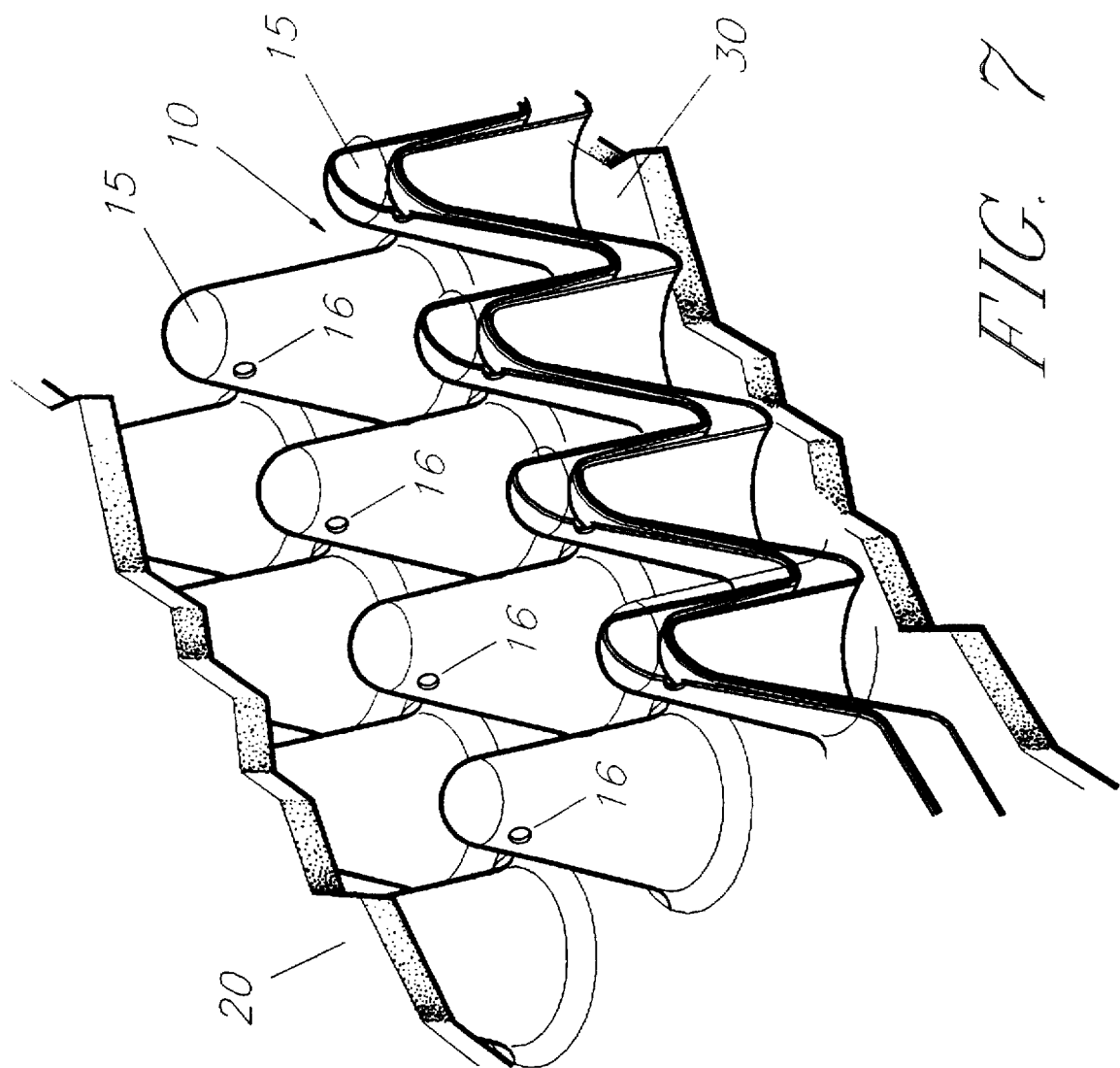
FIG. 7 is an isometric cross-sectional view of another design of a thermal insulation barrier of the present invention between two surfaces.
Figure 8:
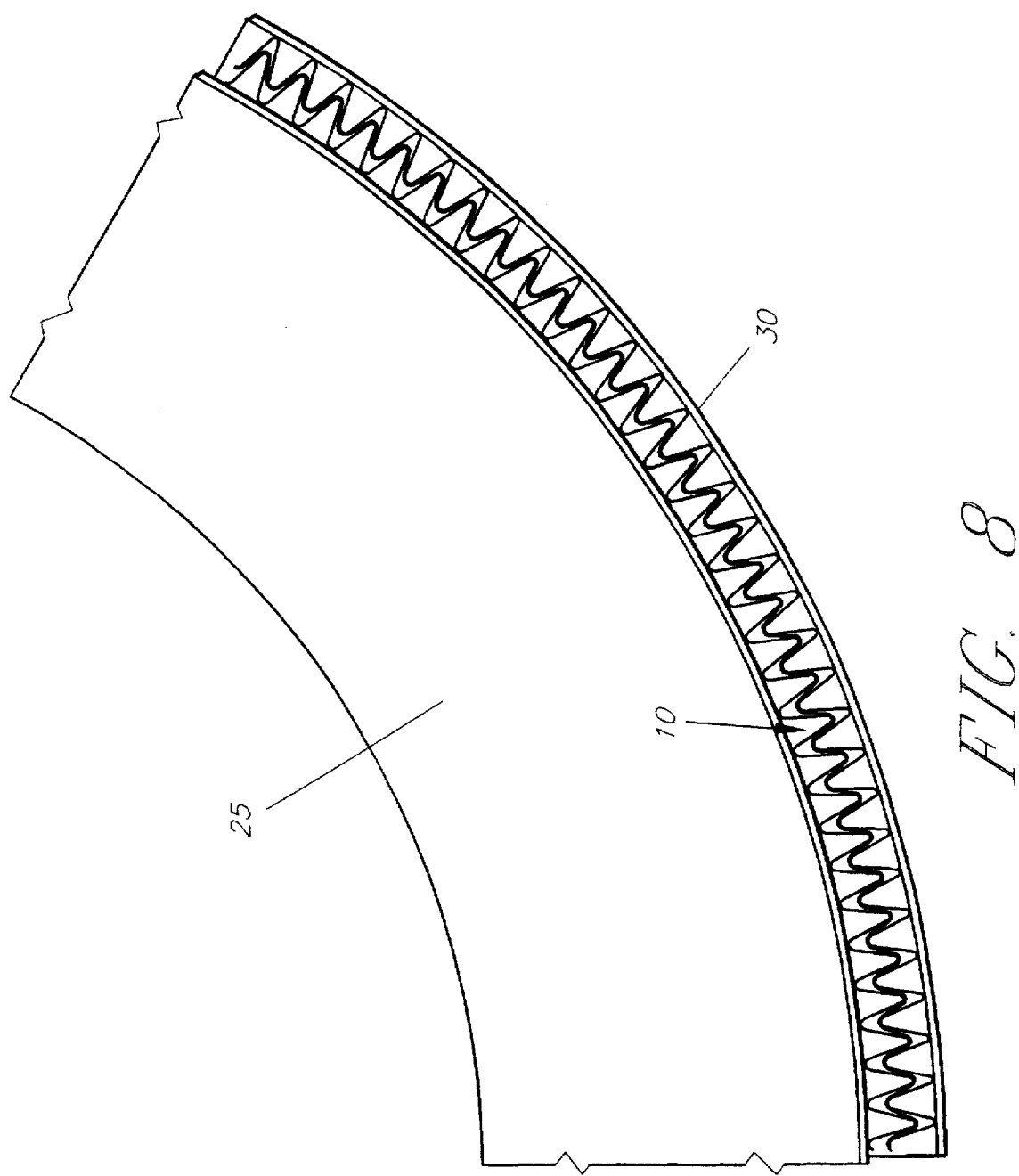
FIG. 8 is an isometric cross-sectional view of one design of a thermal insulation barrier of FIG. 1 showing that a thermal insulation barrier of the present invention may be placed between curved surfaces.

The geometric shape of the stacked thermal insulation elements is not limited to a beam formed by a sine-like wave design. As illustrated in FIG. 7, the geometric shape may be a cone or cone-like; thus, a thermal insulation barrier 10 having a repetitive three dimensional design of cones 15 is placed between two surfaces 20 and 30. To provide a thermal insulation element of the present invention with a repetitive three dimensional design, the geometric shape need not be regular across the total dimension of the element. In other words, the thermal insulation element formed using a design of a sine-like wave may have a beam-like three dimensional design for a number of repetitions, for example two to four, then extend in a flat portion with no three dimensional beam-like design and then again having the three dimensional beam-like design repeated. An alternate three dimensional design is one where the space between beam-like or cone-like designs is extended with varying lengths of flat portions. The thermal insulation elements may be formed into still further geometric shapes or combination of shapes (i.e. combination of beams and cones), may include stiffeners, and may be textured to improve structural and thermal barrier characteristics. The considerations to these alternates is the ease of manufacture and the thickness of the the elements required to support the ultimate load that the thermal insulation barrier 10 must bear. A feature of the cone-like design is that the stacking of the thermal insulation elements locks movement in both directions 90° to the stacking direction.

The illustration of the thermal insulation barriers 10 of the present invention are shown to this point as being between surfaces 20 and 30 without any description of what those surfaces are. The reason is that those surfaces may be (1) part of a structure independent of the thermal insulation barriers such as the box within a box or refrigerator where the surfaces are the outer and inner boxes or (2) part of the structure of the thermal insulation barriers. This later overall structure is referred to herein as a panel and will be described in more detail hereinafter.

It is to be understood that when the space between surfaces is described as being evacuated that it applies to both panels and non-panels. The space between a box in a box can be evacuated and in certain instances the air removed is replaced in certain systems with a gas having a thermal conductivity much lower than air, such as argon, krypton, radon or xenon and contained at a pressure which may be below ambient pressure. Likewise, a panel in which the surfaces are an envelope to the thermal insulation barrier are preferably evacuated.

When the space is evacuated in which the thermal insulation barriers reside, several approaches may be taken to overcome the point loading on the external thermal insulation element in contact with the outside surface or the skin of the panel. Reference is made to FIG. 1 wherein the compression thermal insulation elements 12 are shown in point contact with the surface 20. One approach is to have load spreaders 17 (see FIGS. 5 and 6), either a solid or compressible structure of a female design which is the same as the male design of the contacting element 12 to provide surface contact a short distance down the contacting element and can be attached to and spread the load on surface 20. Another approach is to use a tension thermal insulation element which will double the thickness at the points of contact of the thermal insulation barrier 10 with the surface 20. Still another approach is to use multiple compression thermal insulation elements or multiple compression thermal insulation elements and finally a tension thermal insulation element.

The choice of repetitive three dimensional design has a bearing on the structural characteristics of the thermal insulation barrier 10. One consideration in the choice of a three dimensional design is that the design accommodate the load on the barrier 10, such as when the space between the surfaces 20 and 30 is evacuated. Another consideration in the choice of a three dimensional design is whether the barrier can be bent. A thermal insulation barrier 10 having the beam-like design is capable of bending as shown in Fig. B. This thermal insulation barrier 10 may be used to insulate a curved surface 25 such as a tank or a pipe. The outside surface 30 may be a material which is easily bendable into a curved surface to hold the thermal insulation barrier 10 in place.

Figure 9:
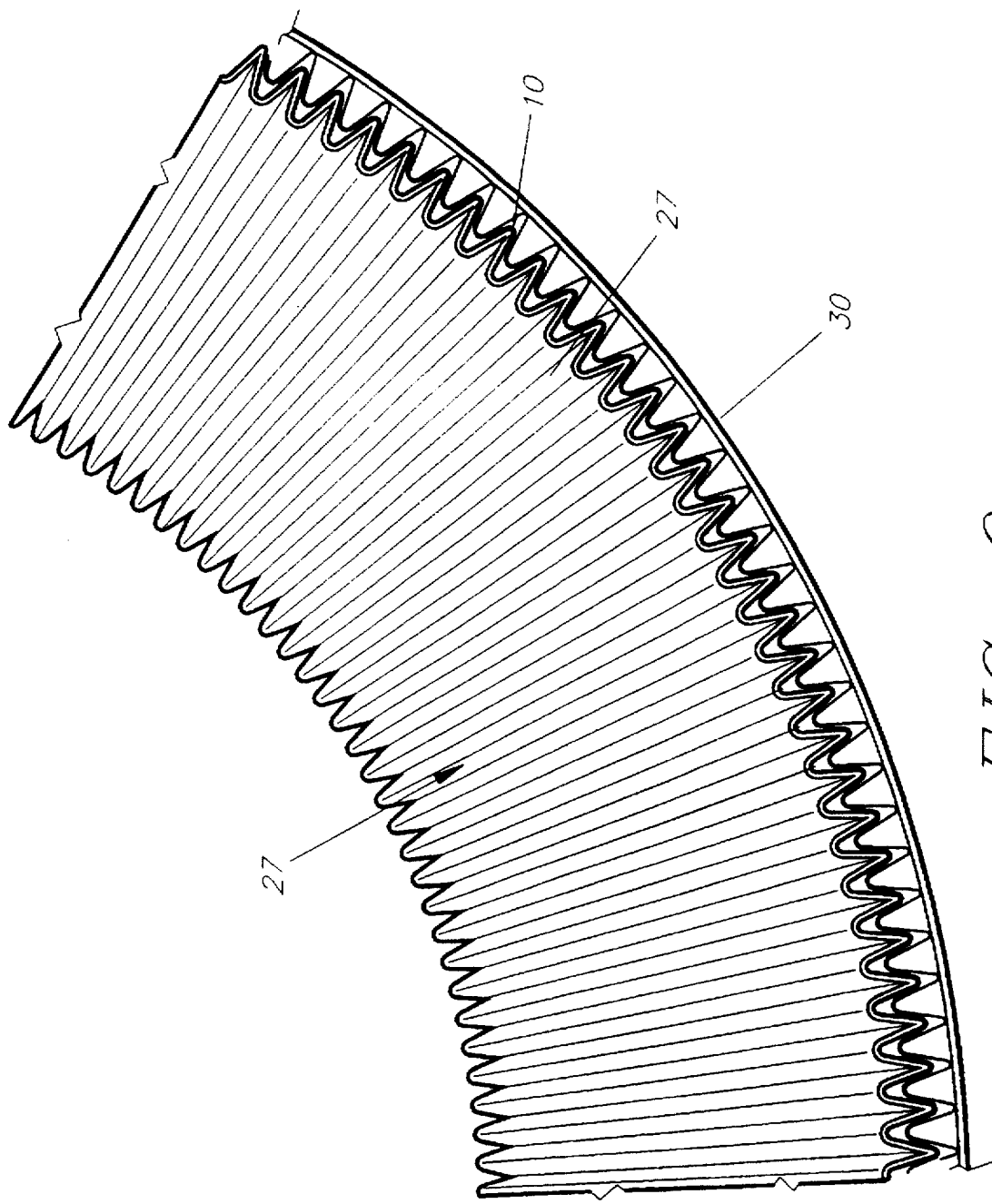
FIG. 9 is an isometric view in partial cross-section of another design of a thermal insulation barrier for curved surfaces.

An alternate design for a curved surface is shown in FIG. 9. In this embodiment the outer surface 27 has the same three dimensional design as the top or outside thermal insulation element which is part of and forms the thermal insulation barrier 10. The design of the surface 20 (27) in FIG. 9 is illustrated as the same beam-like design as a compression element; however, the design may be the same as a tension element. The only difference in surface 27 and the thermal insulation element of the thermal insulation barrier 10 is that the choice of material may be different and the thickness of the surface 27 may be greater than that of the corresponding element.

Figure 10:
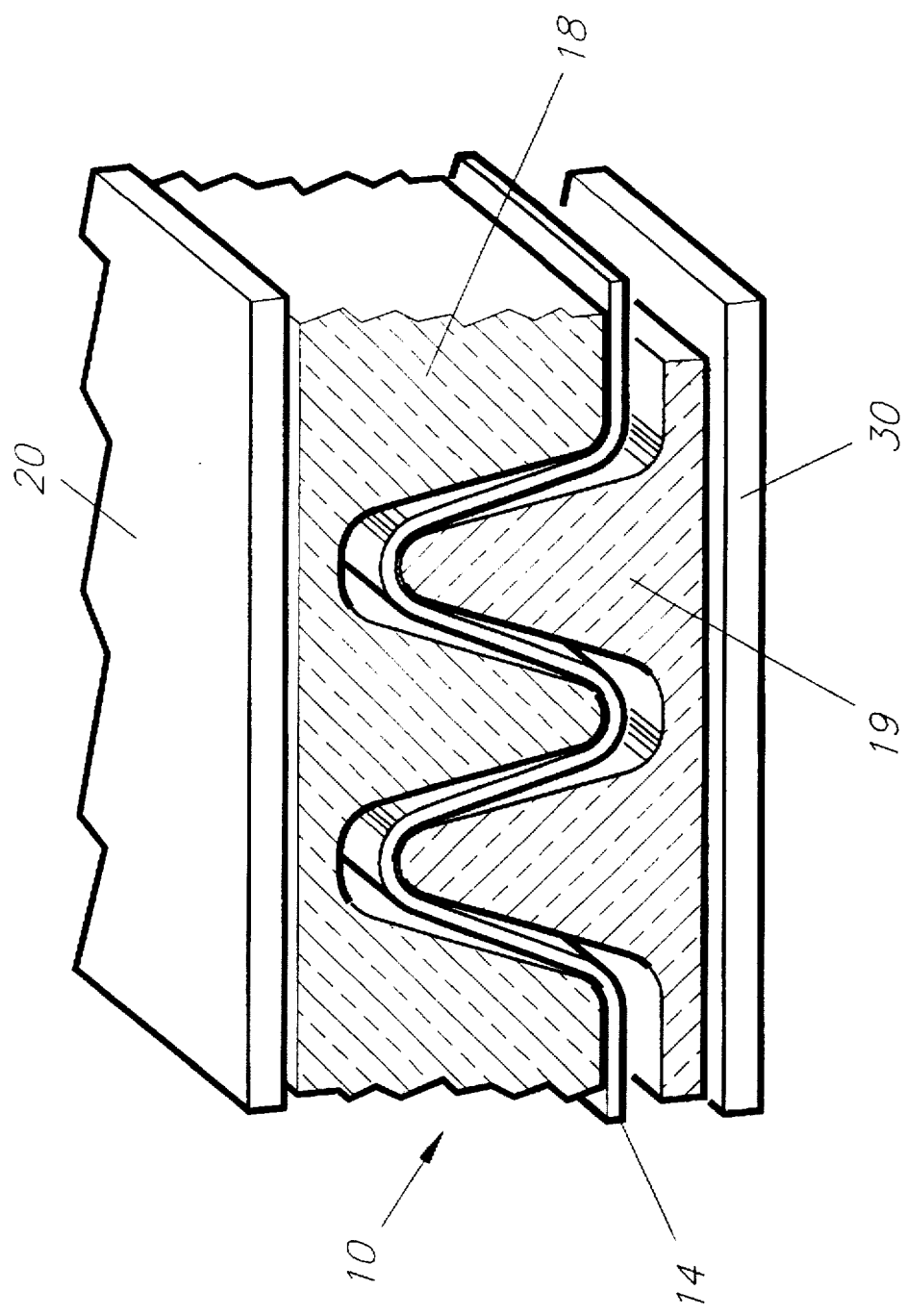
FIG. 10 is an isometric cross-sectional view of another design of a thermal insulation barrier of the present invention between two surfaces using thermal insulation elements that have the three dimensional design on only one surface.

A second embodiment of a thermal insulation barrier 10 of the present invention is shown in FIG. 10. In this embodiment of the barrier, an element 16 or 19 is used which has the three dimensional design on only one surface, the element not being a thin sheet material, and has a substantial cross-sectional area. The thermal insulation elements 18 and 19 are made of a solid, formable, open structured material, such that entrapped gasses may be evacuated, such as open celled polyurethane from ICI, open celled ceramic foams, xerogels, glass/ceramic fiber composites such as Fiberfrax Duraboard 2600, a product of the Carborundum Company, compacted powders such as silica with appropriate binders and formed stainless steel wire mesh. These solid, open structured materials may be formed as a long block which then is cut to form the three dimensional design on one surface or are molded to form the desired three dimensional design. The design may have the same design as a compression element or a tension element to be used in making the barrier 10 of the present invention. As shown in FIG. 10, a barrier 10 of the present invention is made having three elements, a compression element 18 with one flat surface (upper surface) which contacts surface 20 and the other (lower) surface which has the three dimensional design of a compression element, a tension element 14 (as described above) and a second compression element 19 with the upper surface having the three dimensional design and the lower surface flat. The load conditions on the surface 20 may dictate the use of solid, open structured elements or a design of a non-evacuated barrier may also use these elements.

Figure 11:
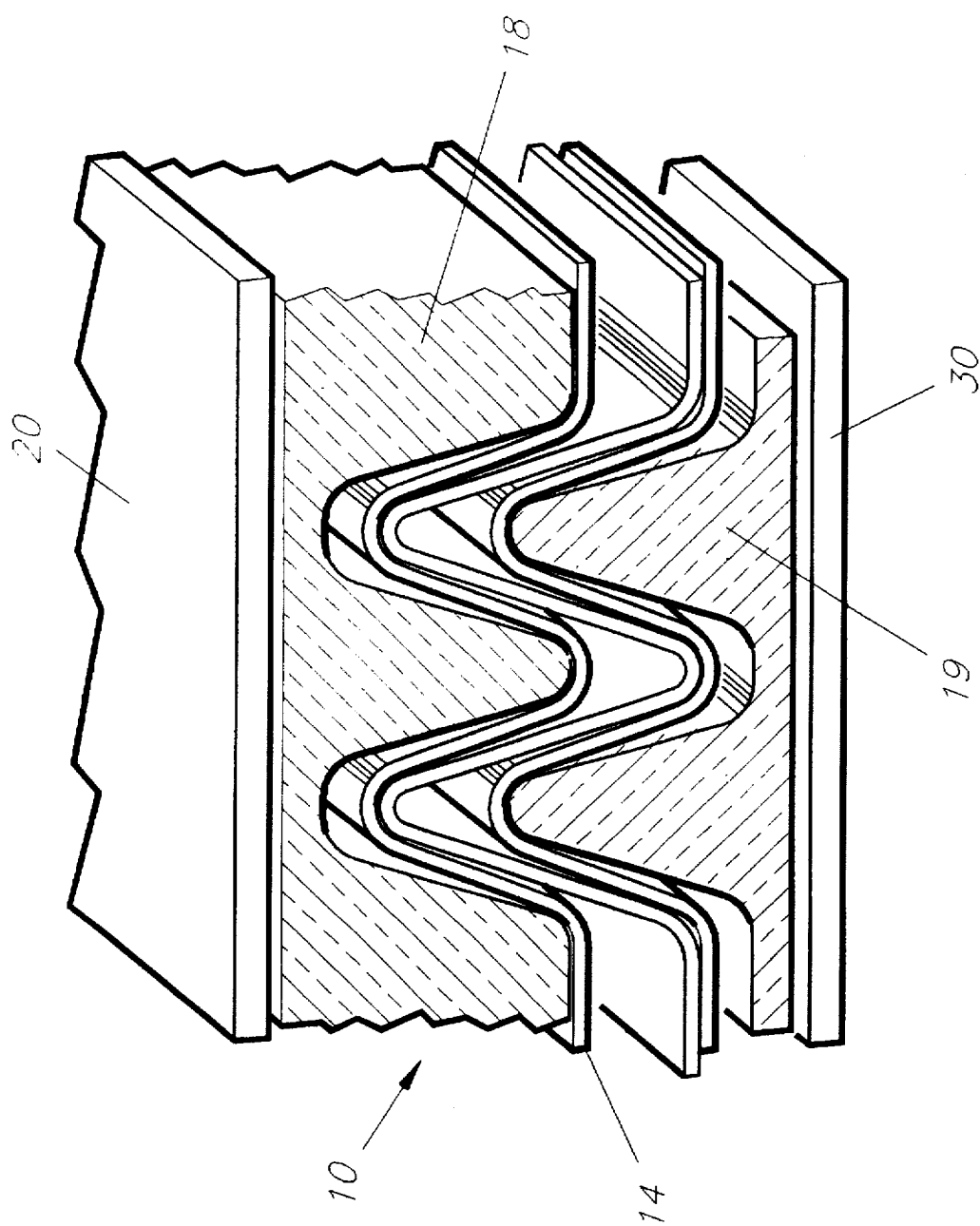
FIG. 11 is a cross-sectional view of a thermal insulation barrier of the present invention between two surfaces using thermal insulation elements that have the three dimensional design on only one surface but also includes a multi-layer of thermal insulation elements.

Now referring to FIG. 11, a multi-layered barrier 10 is shown. In this embodiment, the tensile and compressive elements 14 and 12 respectively may be alternated to increase the R value of the barrier significantly.

Figure 12:
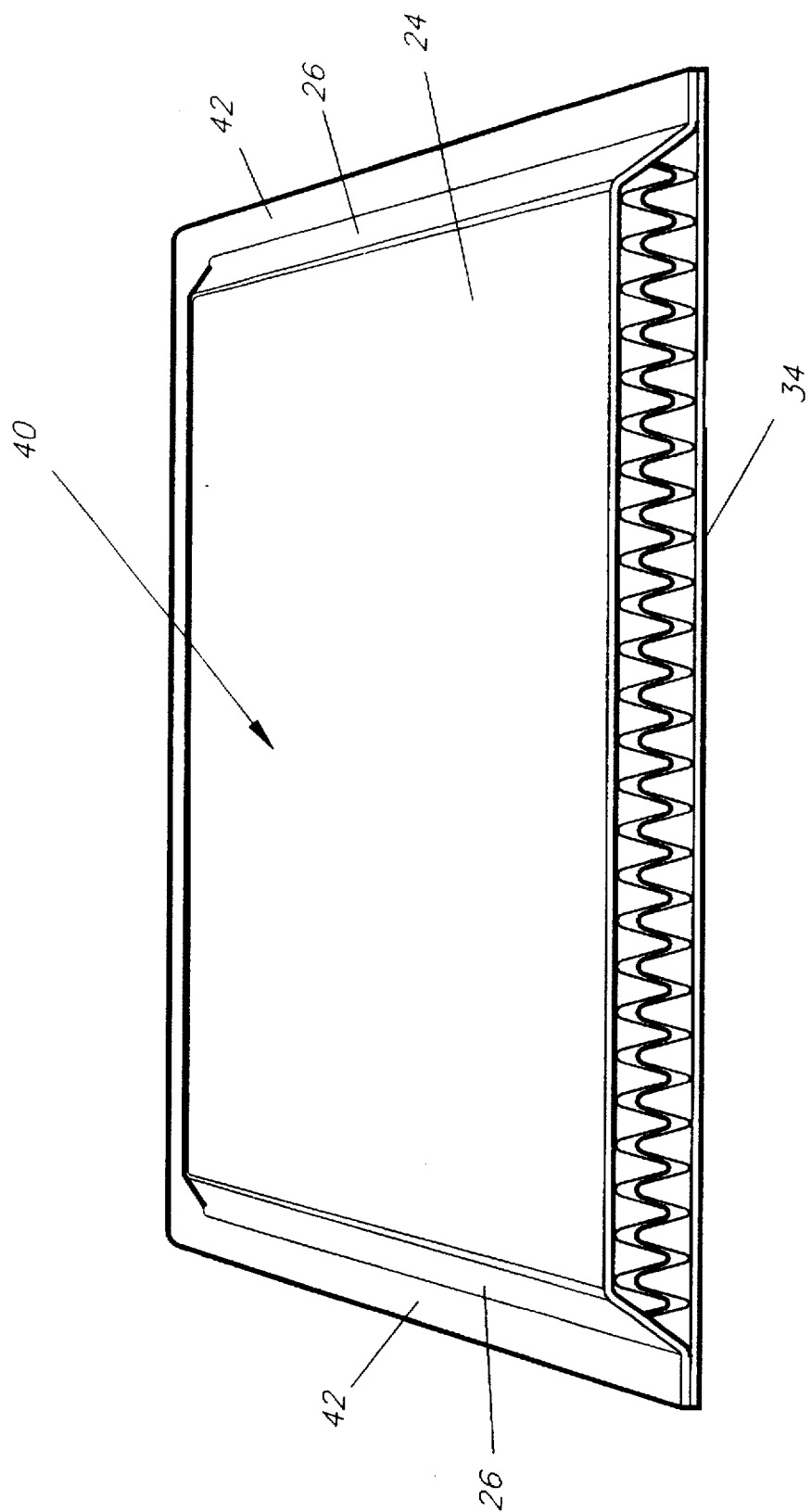
FIG. 12 is an isometric cross-sectional view of a panel of the present invention.

Referring now to FIG. 12, a panel 40 has an outer skin 24 and 34 surrounding a thermal insulation barrier 10 of the present invention. In making a panel 40, the outer skins extend beyond the thermal insulation barrier 10 to form an envelope around the thermal insulation barrier 10 and provide edges 42 to seal the envelope. The thermal insulation barrier 10 supports and maintains the envelope of outer skins 24 and 34 from collapsing on each other when the panel 40 is evacuated. Each panel 40 has a definite size and an outer edge 42 which may have various configurations. The panel as shown in FIG. 12 shows an edge 42 which is the bringing together of the outer skins 24 and 34. These edges 42 are sealed using an adhesive, by thermal welding or by metallic plating and soldering. When sealed with an adhesive, the adhesive thickness is preferably controlled by a ridge or small step around the perimeter of the panel edge produced during the skin forming operation. The panel 40 may also be injection molded in two pieces of the desired size and shape and the thermal insulation barrier 10 inserted into the cavity of one piece. The two pieces may then be sealed by using an adhesive, by thermal welding or by metallic plating and soldering.

Referring now to FIGS. 13 and 14, a panel 40 having an opening 46 is shown. The ability to make panels which provide exceptional thermal barriers with opening recognizes that most surfaces requiring insulation also have piping or electrical access openings or other irregularities in the surface. The configuration of the opening 46 is different in the two Figs. It is recognized that these openings or irregularities must deal with the piping or whatever is passing through these openings as a separate insulation problem. These Figs. also illustrate that one panel 40 (44) may be connected to a second panel 40 (48). While the connection is shown at right angle to the first panel 44, it is understood that the connection may be from 0° to 180°.

FIG. 15 shows another configuration of an opening 46 of a panel 40.

FIGS. 13, 14 and 15 also illustrate a panel 42 having a thermal insulation barrier 10 which supports a getter material 50. Most getter materials are solids which work by physical adsorption, chemical adsorption or absorption to trap or "get" the gases in the evacuated space. Typical gases include water vapor, hydrogen, nitrogen, oxygen, carbon dioxide and the other gases found in the atmosphere or released during the fabrication process. The desired materials for forming the panel 40 have low permeability to these gases; however, when the panel 40 is evacuated and has a life in years, it is desirable to use a getter material to trap any gases to maintain the vacuum in the panel 40. The preferred approach is to substantially eliminate the permeability of gases through the skins of the panels by the choice of material making panel 40 and using a getter material which traps the nitrogen, oxygen and other gases which over long periods time may permeate the surfaces 20 and/or 30 (or skins) of the panel 40.

The outer skin 24 (surface 20) and 34 (surface 30) of the panel 40 (see FIG. 12) is preferably a liquid crystal polymer. These new thermoplastics are aromatic co-polyester thermoplastic polymers that exhibit a highly ordered structure in both the melt and solid states. Known liquid crystal polymers are described in U.S. Pat. No. 4,161,470, incorporated herein by reference, are the Vectra A and C resins, a wholly aromatic polyester based on poly (benzoate-naphthoate) or the Vectra B resin, a wholly aromatic copolyester-amide based on polynaphthoate-aminophenoterephthalate, all of Hoechst Celanese; the Zenite resins, described only as based on aromatic polyesters, of DuPont Chemical Company; and the Xydar resins, a terpolymer of terephthalic acid, p-hydroxybenzoic acid and p,p'-bisphenol linked by ester bonds, of Amoco Chemical Company. These polymers exhibit both low thermal conductivity and low permeability (are high gas barrier materials), making them desirable and suitable for the outer skin of a panel 40. The use of other thermoplastics such as high density polyethylene, polyethylene terephthalate copolyesters, polyetheramides, polyvinylidene fluoride or cross-linked high density polyethylene also may be the material of the outer skin 20 and/or 30 of a panel 40. It is recognized that these other thermoplastic material may be more permeable than the preferred liquid crystal polymers; however, these thermoplastic materials may be coated by a metal or more getter material used in the panel to maintain a suitable vacuum level. Furthermore, a layered composite of a high cost, high barrier film may be laminated to a low cost, low barrier film to achieve a skin for a lower cost and long life panel. The use of thermoplastic materials enables the two skins 20 and 30 to be joined to seal the edges 42 of the envelope they form by using an adhesive, by thermal welding or by metallic plating and soldering. This sealing operation may be done in a vacuum chamber. The use of thermoplastic materials as the formed skin 24, see FIG. 9, because of their low thermal conductivity materially reduces the edge 26 heat loss effect of the panel 40 especially as compared to panels with metal skins. A plastic panel may have edge losses from 2 to over 6 times less than a metal skinned panel. The effect this edge effect has on the entire panel, or enclosure, depends on the overall size of the panel. Smaller panels and enclosures can pay a high penalty for this edge loss and greatly diminish the high R value which may exist in the center of the panel.

The preferred materials for the thermal insulation elements of the present invention are thermoplastics such as polyetherimide or the liquid crystal polymers identified above. These thermoplastics are extruded as sheets and subsequently thermoformed into a sheet having a geometric shape with a repetitive three dimensional design which permits stacking of the elements, one sheet suitable as the compression layer and one sheet suitable as the tension layer. After thermoforming a sheet into a specific shape, the sheets are trimmed via water jet cutting, laser cutting, hot wire cutting or mechanical trimming. In addition to the trimming operation, vent holes may be created in the repetitive three dimensional design in both the compression and tension elements such that air is not trapped between adjacent layers of the thermal insulation elements when the barrier is evacuated. Each thermoplastic sheet is then cleaned and coated with a very thin layer of aluminum, the process known as aluminizing, to increase the surface emittance. The aluminizing is performed by evaporative techniques inside a vacuum chamber. A seed coat of another metallic element may be applied for improving the surface adherence of the aluminum.

The uniqueness of the thermal insulation barriers of the present invention are illustrated in the following examples:

EXAMPLE 1

This example illustrates the thermal insulation barriers of the present invention in an enclosed structure made from metals such as aluminum or stainless steel. A box in box construction:

Thermal insulation elements are made from amorphous polyetherimide (PEI), a product of GE under the GE trade name Ultem 1000. This thermoplastic is extruded as sheet and subsequently thermoformed into sheets of multi-conical geometry, one sheet suitable as the compression layer and one sheet suitable as the tension layer. After thermoforming, the sheets are trimmed via either water jet cutting or laser cutting. In addition to the trimming operation, vent holes are created in the cones in both the compression and tension elements such that air is not trapped between adjacent layers of the thermal insulation elements when the barrier is evacuated. Each sheet is then cleaned and coated with a very thin layer of aluminum, the process known as aluminizing, to increase the surface emittance. The aluminizing is performed by evaporative techniques inside a vacuum chamber. A seed coat of another metallic element may be applied for improving the surface adherence of the aluminum.

The specific box in box structure is one five sided box which is placed inside a larger five sided box with the difference in box widths being twice the wall gap and the wall gap being the same top and bottom as side to side. The aluminized sheets or thermal insulation elements are then stacked alternately to a total height which equals or slightly exceeds the gap spacing of the box in box structure to produce the thermal insulation barrier. These thermal insulation barriers may be bonded or restrained either to the outside surface of the inside box or the inside surfaces of the outside box depending on how the box close-out is assembled. The box close-out is a frame structure that seals the wall gap around the front perimeter of the box in box structure. A second assembly, much shallower in depth, is fabricated to form the structure door. The assembling of the structure is accomplished by sliding the inner box into the outer box with the thermal insulation barriers all in place. The close-out frame structure is then assembled using an adhesive, by thermal welding, or by metallic plating and then soldering. The close-out material is a low permeable thermoplastic such as polyetherimide or a liquid crystal polymer.

An evacuation port is part of the close-out structure in the main structure and the door to pump out the atmospheric gases. A second set of ports is used for back-filling. When evacuated the thermal insulation elements will deflect under load which is non-uniform in the box in box structure, the greatest load being in the middle of the metal panel and reduced loads near the edges due to the structural stiffness of the box edges.

EXAMPLE 2

This example illustrates the thermal insulation barriers in a panel of the present invention wherein the thermal insulation elements use two different materials. A panel of light weight (e.g. 0.5 bs/ft$^2$) construction:

The panel is substantially thinner than one inch (e.g. 0.375 inch) thick.

The thermal insulation barrier is made with a minimum of elements; if three elements are used, two compression and one tension then a R value of approximately 75 Ft$^2$-hr-F/Btu-in is obtained; if five elements are used, three compression and two tension then a R value of approximately 100 Ft$^2$-hr-F/Btu-in is obtained.

The thermal insulation elements are extruded from two different materials, amorphous polyetherimide (PEI), a product of GE under the GE trade name Ultem 1000 and polyethylene terephthalate copolyesters (PETG). The compressive thermal insulation elements are made with the PEI. The tension thermal insulation elements are made with the PETG. The PEI and PETG is extruded into film and rolled in widths of 48 inches or more. The film is then aluminized by entrance (either in bulk or fed through the walls) into a vacuum system via evaporative techniques. Each film may be coated on one or both sides.

The aluminized film is then thermoformed via a thermomechanical method wherein the film is heated and run through rotary and complimentary cylinders (with the appearance of meshing gears) to produce the sine-like beam structure as depicted in FIG. 1. The cylinders used to produce the geometric shape having a repetitive three dimensional design for the PEI sheet is not the same but complimentary to that for the PETG. The thermoformed sheets are then cut and trimmed to the size and shape of the desired thermal insulation barrier to be made. The PEI and PETG thermal insulation elements are then stacked to form the desired thermal insulation barrier.

The panel skins are made from a liquid crystal polymer, VECTRA A-950 made by Hoechst Celanese under the trade name VECTRA which is a high permeation barrier thermoplastic. The panel is made where both surfaces are made with SECTRA; however, one skin may alternatively be a metal such as 300 series stainless steel or aluminum. At least one piece of the thermoplastic is thermoformed into a panel with a flat lip as shown in FIG. 12.

The panel skins and the thermal insulation elements are then assembled in a vacuum chamber which eliminates the need for subsequent evacuation. The flat lip of the thermoformed panel skin provides a surface for bonding the other skin using a thixotropic paste adhesive such as HYSOL EA 934 NA, a product of The Dexter Corp., or welding using friction welding techniques such as ultrasonic, or electroless plated with a copper/nickel system and subsequently soldered together.

A replaceable getter material is introduced to the evacuated region of the panel to maintain the vacuum over a significant time span.

This example illustrates that the thermal insulation elements which make the thermal insulation barrier may be selected from a wide variety of different materials; however, the material for the compression element is selected for its high modulus, low thermal conductivity and low cost while the material for the tension element is selected for its high tensile strength, low thermal conductivity and low cost.

EXAMPLE 3

This example illustrates a panel of the present invention having a very high thermal resistance (i.e. a high R value). A panel one inch thick:

The procedure of Example 2 is followed except that the compressive thermal insulation elements, the tension thermal insulation elements and panel skins are all made of liquid crystal polymer, Vectra A-950 made by Hoechst Celanese. The thermal insulation barrier has between 10 to 40 layers of the alternately stacked compressive thermal insulation elements and tension thermal insulation elements. The sheets of the liquid crystal polymer are thermoformed such that the extruded machine direction is in the direction of the beams.

EXAMPLE 4

This example illustrates a panel of the present invention having the inner or outer skin, or both, formed to have the same design as one of the thermal insulation elements of the thermal insulation barrier in the panel. A semi-flexible panel:

The procedure of Example 3 is followed, the compressive thermal insulation elements, the tension thermal insulation elements and panel skins are all made of liquid crystal polymer, Vectra A-950 made by Hoechst Celanese, except that at least one skin is formed to produce the sine-like beam structure as depicted in FIG. 1. The panel skin is thicker than the thermal insulation elements and is cut so as to be longer than the thermal insulation elements of the thermal insulation barrier. If used in the configuration of FIG. 9, the skin may replace the outermost compressive thermal insulation element of the thermal insulation barrier,i.e. the first element of the thermal insulation barrier is a tension element. The use of an outer skin thus has the accordion-like surface that can be compressed or stretched without incurring high stresses on the skin. Alternatively, the panel skin which is formed to conform to the design of the thermal insulation barrier may be on one or both sides and may be formed as the compression or tension member.

These panels are formed for application around cylinders or formed with a curved geometry suitable for spheres.

It is understood that other combinations or the combination of the structures illustrated are within the spirit of the invention as set forth in the following claims.

I claim:

1. A thermal insulation barrier which comprises:
    at least two different stacked thermal insulation elements, each said element formed of a structural material having a geometric shape of a three dimensional design and said geometric shapes of said different thermal insulation elements are complementary,
    said elements stacked whereby said complementary elements provide minimal contact and space between elements such that the heat conduction path of said barrier is extended and lock said elements in at least one direction 90° to the stacking direction.

2. A thermal insulation element according to claim 1 wherein said structural material has a highly emittant surface.

3. A thermal insulation element according to claim 2 wherein said structural material is selected from the group consisting of thermoplastics, thermosets, ceramics, metals and composites.

4. A thermal insulation element according to claim 3 wherein said structural material is thermoplastic.

5. A thermal insulation element according to claim 4 wherein said thermoplastic structural material is a liquid crystal polymer.

6. A thermal insulation element according to claim 2 wherein said structural material has both surfaces with said repetitive three dimensional design.

7. A thermal insulation barrier which comprises:
    at least three alternately stacked thermal insulation elements, each said element formed of a structural material with a highly emittant surface having a geometric shape of a repetitive three dimensional design which permits stacking of said element with another thermal insulation element and which locks movement of adjacent thermal insulation elements in at least one of the directions 90° to the stacking direction;
    two of said thermal insulation elements having the same design, said alternate thermal insulation element having different and a complementary design, whereby when said three elements are alternately stacked, any point of contact between thermal insulation elements is a contact between said alternate thermal insulation element and only one of said other thermal insulation elements.

8. A thermal insulation barrier according to claim 7 wherein said material for said alternately stacked thermal insulation elements is selected from the group consisting of thermoplastics, thermosets, ceramics, metals and composites.

9. A thermal insulation barrier according to claim 7 wherein said material is a thermoplastic.

10. A thermal insulation barrier according to claim 9 wherein said thermoplastic material is a liquid crystal polymer.

11. A thermal insulation barrier according to claim 7 wherein said alternate thermal insulation element is in tension.

12. A multi-layer thermal insulation barrier according to claim 7 wherein said thermal insulation elements of said same design are in compression and alternately stacked with said thermal insulation elements of complimentary design in tension.

13. A thermal insulation barrier which comprises:
    alternately stacked thermal insulation elements, said stack having a top and bottom element;
    said top and bottom elements formed of a structural material with one surface having a geometric shape of a repetitive three dimensional design which permits stacking of said element with another thermal insulation element and which locks movement of adjacent thermal insulation elements in at least one of the directions 90° to the stacking direction; and at least one alternate thermal insulation element having a complementary design, whereby when said elements are stacked, any point of contact between thermal insulation elements a contact between said alternate thermal insulation element and only one of said other thermal insulation elements.

14. A thermal insulation barrier according to claim 13 wherein said alternate thermal insulation element is in tension.

15. A thermal insulation barrier according to claim 13 wherein there are a plurality of thermal insulation elements, said alternately stacked thermal insulation elements formed of a structural material with a highly emittant surface having a geometric shape of a repetitive three dimensional design which permits stacking of said element with another thermal insulation element and which locks movement of adjacent thermal insulation elements in at least one of the directions 90° to the stacking direction;

said alternate thermal insulation element having a complementary design, whereby when said three elements are alternately stacked, any point of contact between thermal insulation elements is a contact between said alternate thermal insulation element and only one of said other thermal insulation elements.

16. A thermal insulation barrier according to claim 15 wherein said material for said alternately stacked thermal insulation elements is selected from the group consisting of thermoplastics, thermosets, ceramics, metals and composites.

17. A thermal insulation barrier according to claim 15 wherein said material is a thermoplastic.

18. A thermal insulation barrier according to claim 17 wherein said thermoplastic material is a liquid crystal polymer.

19. A thermal insulation barrier according to claim 15 wherein said alternate thermal insulation element is in tension.

20. An insulation panel which comprises:

an envelope of thin skin high gas barrier material; and a thermal insulation barrier which supports said skin, said skin surrounding said barrier and is evacuated; and said barrier comprising at least three alternately stacked thermal insulation elements, each said element formed of a structural material with a highly emittant surface having a geometric shape of a repetitive three dimensional design which permits stacking of said element with another thermal insulation element and which locks movement of adjacent insulation elements in at least one of the directions 90° to the stacking direction;

two of said insulation elements having the same design, said alternate element insulation element having different and a complementary design, whereby when said three elements are alternately stacked, any point of contact between insulation elements is a contact between said alternate insulation element and only one of said other insulation elements.

21. An insulation panel according to claim 20 wherein said envelope of thin skin high gas barrier material is made of the same material for the upper portion of said envelope and the lower portion of said envelope.

22. An insulation panel according to claim 20 wherein said envelope of thin skin high gas barrier material is made of different material for the upper portion of said envelope and the lower portion of said envelope.

23. An insulation panel according to claim 20 wherein said thermal insulation barrier which supports said skin has insulation elements made of a material selected from the group consisting of thermoplastics, thermosets, ceramics, metals and composites.

24. An insulation panel according to claim 20 wherein said thermal insulation barrier which supports said skin is made of a multi-layer thermal insulation barrier with a beam design.

25. An insulation panel according to claim 20 wherein said thermal insulation barrier which supports said skin is made of a multi-layer thermal insulation barrier with a cone design.

26. An insulation panel according to claim 20 wherein said thermal insulation barrier supports a getter material.

27. An insulation panel according to claim 20 wherein at least one skin of said envelope of thin skin high gas barrier material is made having the same shape as said two of said insulation elements and replaces the outermost insulation element of said thermal insulation barrier.

28. An insulation panel according to claim 20 wherein both of said skins of said envelope of thin skin high gas barrier material is made having the same shape as said two of said insulation elements and replaces both outermost insulation elements of said thermal insulation barrier.

29. A thermal insulation barrier which comprises:

at least three alternately stacked thermal insulation elements, each said element formed of a structural material having a geometric shape of a three dimensional design.

two of said thermal insulation elements having the same geometric shape, said alternate thermal insulation elements having a different and complementary design, whereby when said three elements are alternately stacked said complementary design provides minimal contact and space between elements such that the length of the heat conduction path of said barrier is extended and lock said elements in at least one direction 90° to the stacking direction.

* * * * *